(No Model.)
E. JUNGENFELD & H. RASSBACH.
OIL DRIP AND SEPARATING TANK FOR AMMONIA GAS PUMPS.
No. 332,344. Patented Dec. 15, 1885.
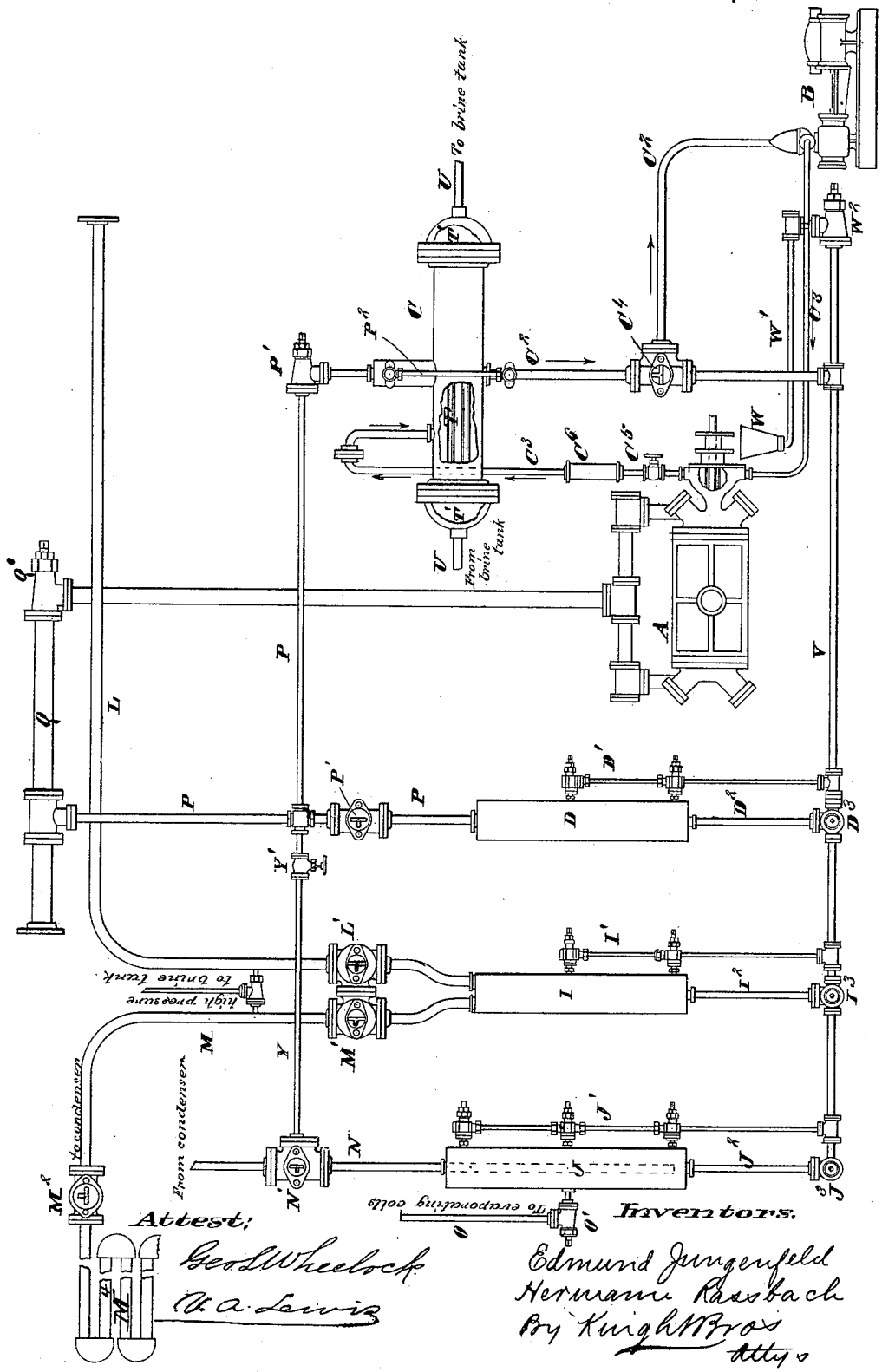
Attest:
Geo L Wheelock
C. A. Lewis
Inventors.
Edmund Jungenfeld
Hermann Rassbach
By Knight Bros
Attys

UNITED STATES PATENT OFFICE.

EDMUND JUNGENFELD AND HERMANN RASSBACH, OF ST. LOUIS, MISSOURI, ASSIGNORS TO THE EMPIRE REFRIGERATING COMPANY, OF SAME PLACE.

OIL-DRIP AND SEPARATING-TANK FOR AMMONIA-GAS PUMPS.

SPECIFICATION forming part of Letters Patent No. 332,344, dated December 15, 1885.

Application filed November 17, 1884. Serial No. 148,188. (No model.)

*To all whom it may concern:*

Be it known that we, EDMUND JUNGENFELD and HERMANN RASSBACH, of the city of St. Louis, State of Missouri, have invented a certain new and useful Improvement in Oil-Drips and Separating-Tanks for Ammonia-Gas Pumps, of which the following is a full, clear, and exact description, reference being had to the accompanying drawing, forming part of this specification, and which is a side elevation of our system.

Our invention relates to improvements in oil-drips and separating-tanks for ammonia-gas pumps, the function of which is to purify the liquid ammonia of all dirt that may be taken up in its passage through long pipes or elsewhere, or in other places where lubricating-oil is used; furthermore, to enable a person to regulate and control each and every part of the system, so as to break joints and make repairs in case of need without loss of gas.

Our invention consists in features of novelty hereinafter fully described, and pointed out in the claims.

Referring to the drawing, A represents a gas-compressor; B, a force-pump; C, an oil-cooler; D, a low-pressure drip cylinder or tank; I, a high-pressure drip tank or cylinder, and J a liquid-receiver, all of which are connected by a system of pipes provided with cocks or valves by which the above result is obtained.

The compressed gas which is delivered by the pump (not shown) carries oil with it that is used for lubricating the cylinder through the pipe L, provided with a valve, L', to the high-pressure drip-cylinder I. Part of this oil, which is in drops and may carry impurities along with it, deposits in the cylinder I, while the gas, with which more or less vaporized oil is mixed, goes up to the condenser $M^4$ through the pipe M, which is provided with a three-way valve or cock, M', the valve L' also being three-way. From the condenser where the gas and oil are liquefied the two bodies travel in a mixed state through the pipe N to the bottom of the liquid receiver or separator J. The pipe N is provided with a three-way cock or valve, N'. In consequence of the higher specific gravity of the oil to liquid ammonia the oil settles to the bottom of the tank or receiver, and the liquid ammonia which is intended to be utilized is taken out from the upper part of the tank through the pipe O, which is provided with a valve, O', to the evaporating-coils. The evaporated ammonia which is carried from the oil-cooler C (it having collected there from the oil) through pipes P and Q to the suction side of the compressor delivers, before entering the pipe Q, all of its impurities into the low pressure tank D through the pipe P, which is provided with valves or cocks P'. A glass gage, $P^2$, is employed to indicate the gas in the cooler.

During the operation of the machine, oil is continuously circulated through the stuffing-box of the compressor by means of the pump B and pipes $C^2$ $C^3$. The pipes are provided with valves $C^4$ $C^5$, and the pipe $C^3$ is provided with a sight-tube, $C^6$. The oil is taken from the cooler through the pipe $C^2$, and returns (after having filled its function by cooling the piston-rod of the compressor, lubricating the same, and carrying along the leakage of ammonia-gas, if any) through the pipe $C^3$ back again to the oil-cooler, where it is reduced in temperature for further use. The cooler preferably consists of a cylinder having tubes T and hollow heads T', through which cold brine is circulated by pipes U, leading from and to a brine-tank. The oil is discharged into the cylinder and circulates over and around the pipes or tubes T, whereby it becomes thoroughly cooled.

The level of the oil or liquid ammonia in the tanks or cylinders D I J can be seen by glass gages D', I', and J'. The bottoms of these tanks are connected by means of pipes $D^2$, $I^2$, and $J^2$, provided with valves $D^3$, $I^3$, and $J^3$, to a pipe, V, common to all, and by opening either of the cocks or valves $D^3$, $I^3$, or $J^3$ and turning the three-way cock $C^4$ in pipe $C^2$ in a corresponding direction the oil can be taken back by the pump B to the cooler C, where it originally came from. Any oil that may leak through the stuffing-box of the compressor is collected in the funnel W, and through pipe W', provided with a valve, $W^2$, is returned to the circulation.

The low-pressure drip-tank and oil-cooler can be evacuated by shutting off the liquid-supply by cock P', and the regular operation may continue.

To evacuate the high-pressure drip-tank I, it is necessary to turn the three-way cocks L' M' so that the passage of the gas is disconnected from the tank, and by opening the cocks I³ and D³ the high-pressure is connected with the low-pressure tank. In a similar way the liquid-receiver J is evacuated by closing off the supply of liquid from the condenser, and opening the communication between the receiver and the tank D, which is made by pipes N and P, and a pipe, Y, provided with a valve, Y'.

To pump a vacuum on the condenser, it is necessary to close the valve M² in the pipe M, leading to the condenser, and to open valves V' and N'. By this a connection is opened between the condenser and suction-pipe, and all the compressed gas can be forced through the valve O' and pipe O to the evaporating-coils, (not shown,) which during this operation are closed off from suction side of compressor by valve or cock Q' in pipe Q.

We claim as our invention—

1. The combination, with the tanks or cylinders D, I, and J, the pipes D², I², and J², having valves D³, I³, and J³, of the pump B, and the pipes V C², connecting said cylinders with the suction side of said pump, whereby either of said cylinders may be evacuated, substantially as set forth.

2. The combination, with the tanks D and I and the pipes D² and I², having the cocks D³ and I³, of the pump B, the pipes V and C², connecting said pipes D² and I² with the suction side of said pump, the cooler C, and the circulating-pipes C² C³, substantially as set forth.

3. The combination of the high-pressure drip-tank and pipes L and M, provided with three-way cocks or valves, whereby a circulation of gas is had either through the tank or direct to the condenser, substantially as specified.

4. The combination, with the cooler C and the compressor A, of the pipes P Q, connecting said cooler with the suction side of said compressor, and the low-pressure cylinder D.

5. The combination of the condenser and liquid-receiver J, connected by a pipe, N, provided with a three-way valve, whereby a vacuum may be pumped on the condenser for connecting it to the suction side of the compressor, with which it is connected by pipes, substantially as set forth.

6. The combination, with the cooler C and the compressor A, of the pipes P Q, connecting said cooler with the suction side of said compressor, the low-pressure drip-cylinder D, the pump B, the pipes D², V, and C², connecting said cylinder with the suction side of said pump, and the circulating-pipes C² C³, all constructed and arranged to operate substantially as set forth.

EDMUND JUNGENFELD.
HERMANN RASSBACH.

In presence of—
GEO. H. KNIGHT,
SAML. KNIGHT.